United States Patent
Selfors et al.

(10) Patent No.: US 10,486,281 B2
(45) Date of Patent: Nov. 26, 2019

(54) OVERLOAD DETECTION IN A POWER TOOL

(71) Applicant: Milwaukee Electric Tool Corporation, Brookfield, WI (US)

(72) Inventors: David H. Selfors, Pewaukee, WI (US); Brian Trump, Germantown, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 266 days.

(21) Appl. No.: 15/378,757

(22) Filed: Dec. 14, 2016

(65) Prior Publication Data
US 2017/0170774 A1    Jun. 15, 2017

Related U.S. Application Data

(60) Provisional application No. 62/267,098, filed on Dec. 14, 2015.

(51) Int. Cl.
| | | |
|---|---|---|
| *B24B 23/02* | (2006.01) | |
| *B25F 5/00* | (2006.01) | |
| *H02H 7/00* | (2006.01) | |
| *H02P 29/10* | (2016.01) | |
| *H02H 7/093* | (2006.01) | |
| *B23Q 11/04* | (2006.01) | |

(52) U.S. Cl.
CPC .............. *B24B 23/028* (2013.01); *B25F 5/00* (2013.01); *H02H 7/093* (2013.01); *H02P 29/10* (2016.02); *B23Q 11/04* (2013.01)

(58) Field of Classification Search
CPC ...... B24B 23/028; H02P 29/10; H02P 29/032; B25F 5/00; H02H 7/00

USPC ............................................................ 173/2
See application file for complete search history.

(56) References Cited

U.S. PATENT DOCUMENTS

| | | | | |
|---|---|---|---|---|
| 4,267,914 | A | * 5/1981 | Saar | ...................... B23Q 11/04 173/181 |
| 5,062,743 | A | 11/1991 | Wieland et al. | |

(Continued)

FOREIGN PATENT DOCUMENTS

| | | |
|---|---|---|
| CN | 103124065 | 5/2013 |
| CN | 103184971 A | 7/2013 |
| EP | 2724821 | 4/2014 |

OTHER PUBLICATIONS

International Search Report and Written Opinion for Application No. PCT/US2016/066594 dated Mar. 31, 2017 (11 pages).

(Continued)

*Primary Examiner* — Hemant Desai
*Assistant Examiner* — Amelia Jae-Ippel Vorce
(74) *Attorney, Agent, or Firm* — Michael Best & Friedrich LLP

(57) ABSTRACT

A power tool includes a motor, a power circuit coupled to the motor, and a speed sensor coupled to the motor. The power circuit provides power to the motor. The speed sensor detects a position of the motor. The power tool also includes an electronic processor coupled to the motor and the speed sensor. The electronic processor is configured to receive an output signal from the speed sensor indicative of a measured speed of the motor at a first time, determine a cumulative value based on the measured speed of the motor, and interrupt power from the power circuit to the motor when the cumulative value exceeds an accumulator threshold.

16 Claims, 5 Drawing Sheets

(56) References Cited

U.S. PATENT DOCUMENTS

| | | | |
|---|---|---|---|
| 5,602,708 A | 2/1997 | Felgenhauer | |
| 5,894,095 A | 4/1999 | DeMali | |
| 6,087,815 A * | 7/2000 | Pfeifer | B25F 5/00 |
| | | | 323/282 |
| 6,863,165 B2 | 3/2005 | Koslowski | |
| 6,965,222 B2 | 11/2005 | Yokoyama et al. | |
| 7,518,837 B2 | 4/2009 | Tseng et al. | |
| 7,579,708 B2 | 8/2009 | Shibata et al. | |
| 7,652,438 B2 | 1/2010 | Rosskamp | |
| 7,730,964 B2 | 6/2010 | Simm et al. | |
| 7,936,142 B2 | 5/2011 | Otsuka et al. | |
| 8,476,853 B2 | 7/2013 | Vanko et al. | |
| 8,568,066 B2 | 10/2013 | Beichter | |
| 8,587,231 B2 | 11/2013 | Pant | |
| 8,881,842 B2 | 11/2014 | Borinato et al. | |
| 9,109,670 B2 | 8/2015 | Roehm et al. | |
| 2005/0162114 A1 | 7/2005 | Makaran | |
| 2008/0024940 A1 | 1/2008 | Plunkett et al. | |
| 2008/0297011 A1 | 12/2008 | Delaney et al. | |
| 2009/0096395 A1 * | 4/2009 | Nakayama | H02P 6/34 |
| | | | 318/400.15 |
| 2011/0186318 A1 | 8/2011 | Ichikawa | |
| 2012/0223121 A1 * | 9/2012 | Viola | A61B 17/072 |
| | | | 227/175.1 |
| 2013/0119909 A1 | 5/2013 | Clemons et al. | |
| 2013/0126202 A1 * | 5/2013 | Oomori | B25B 21/00 |
| | | | 173/217 |
| 2013/0133912 A1 * | 5/2013 | Mizuno | B25B 23/1405 |
| | | | 173/180 |
| 2014/0021736 A1 * | 1/2014 | Chenowth | H02H 7/0855 |
| | | | 296/100.11 |
| 2014/0225549 A1 | 8/2014 | Lutz et al. | |
| 2015/0034349 A1 * | 2/2015 | Proudlock | A01D 34/90 |
| | | | 173/176 |
| 2015/0042252 A1 | 2/2015 | Kitagawa | |
| 2015/0047866 A1 | 2/2015 | Sakai et al. | |
| 2015/0080912 A1 * | 3/2015 | Sapre | A61B 17/068 |
| | | | 606/139 |
| 2015/0349695 A1 | 12/2015 | Hosokawa et al. | |

OTHER PUBLICATIONS

Chinese Patent Office Action for Application No. 201680073644.0, dated Apr. 2, 2019, 10 pages.
European Patent Office Search Report for Application No. 16876553.5, dated Jul. 23, 2019, 9 pages.

* cited by examiner

OVERLOAD DETECTION IN A POWER TOOL

RELATED APPLICATIONS

This application claims priority to U.S. Provisional Patent Application No. 62/267,098 filed on Dec. 14, 2015, the entire contents of which are incorporated herein by reference

FIELD OF THE INVENTION

The present invention relates to detecting an overload condition on a power tool.

BACKGROUND

Each power tool may include a different motor selected specifically for the tasks completed by the power tool. Each motor has a different set of operating parameters and is able to operate at different load levels. When a motor is operated above its predetermined maximum load level, the motor may break or burn due to the excess current through the motor components. To prevent damage to the power tool, power tools are typically shutdown when an overload condition is detected. For example, in some power tools, a load current is monitored to detect the overload condition, and the power tool is automatically shut down when the load current exceeds a current threshold for longer than a predetermined time duration threshold. Typically, such duration thresholds are low and cause a premature shut-down of the power tool. By prematurely shutting down the power tool, the user is unable to fully utilize the energy of the power tool.

SUMMARY OF THE INVENTION

In one exemplary embodiment, the invention provides a power tool including a motor, a power circuit coupled to the motor for providing power to the motor, and a speed sensor coupled to the motor for detecting a position of the motor. The power tool also includes an electronic processor coupled to the motor and the speed sensor. The electronic processor is configured to receive an output signal from the speed sensor indicative of a measured speed of the motor at a first time, determine a cumulative value based on the measured speed of the motor, and interrupt power from the power circuit to the motor when the cumulative value exceeds an accumulator threshold.

In another exemplary embodiment, the invention provides a method of operating a power tool. The method includes powering a motor of the power tool, detecting a position of the motor of the power tool with a speed sensor, and receiving, at an electronic processor, an output signal from the speed sensor indicative of a measured speed of the motor at a first time. The method also includes determining a cumulative value based on the measured speed of the motor, and interrupting power to the motor when the cumulative value exceeds an accumulator threshold.

Another exemplary embodiment of the invention provides a method of operating a power tool. The method includes powering a motor of the power tool, and detecting a speed of the motor with a sensor. The method also includes receiving a measured speed of the motor from the sensor at an electronic processor, detecting an overload condition of the motor based on the measured speed of the motor, and generating, via the electronic processor, a cumulative value based on the measured speed of the motor. Finally, the method further includes maintaining operation of the motor unchanged while the cumulative value remains less than an accumulator threshold.

Other aspects of the invention will become apparent by consideration of the detailed description and accompanying drawings.

Figure 1:
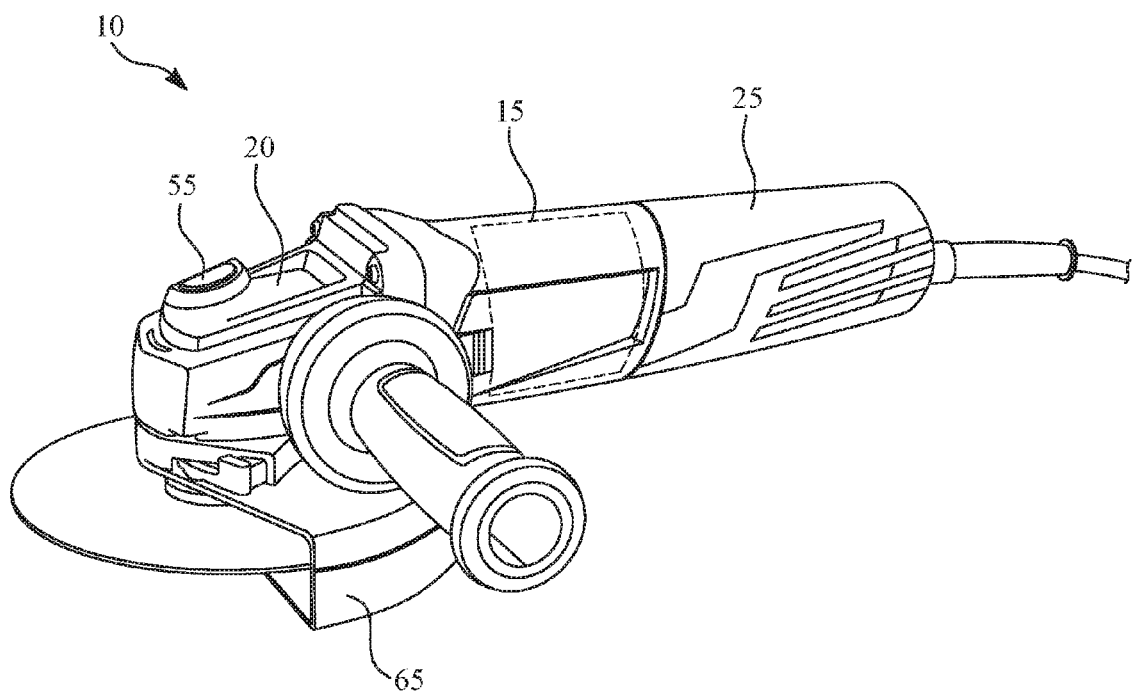
FIG. 1 illustrates a power tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

DETAILED DESCRIPTION

Figure 2:
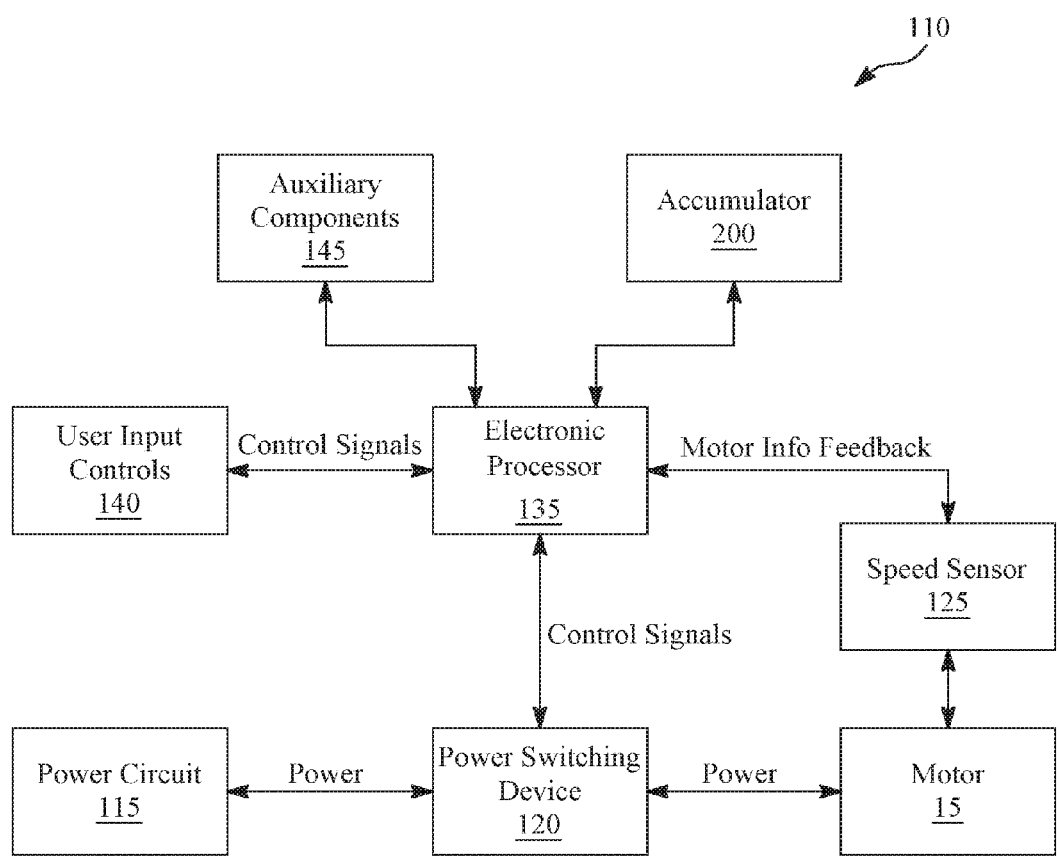
FIG. 2 illustrates a block diagram of the power tool.

FIG. 1 illustrates a power tool 10 having a motor 15. In a power tool, such as the power tool 10 shown in FIG. 1, switching elements are selectively enabled and disabled by control signals from an electronic processor 135 (FIG. 2) to selectively apply power from a power source (e.g., AC source such as a wall outlet) to drive a motor. In the illustrated embodiment, the power tool 10 is a grinder having a housing 20 with a handle portion 25. The power tool 10 further includes a trigger 55 or similar actuator, a power circuit 115 (FIG. 2), and guard 65. Although the power tool 10 illustrated in FIG. 2 is an AC grinder, the present description applies also to other power tools having a motor such as, for example, an impacting wrench, a hammer drill, an impact hole saw, an impact driver, a drill, a reciprocating saw, and the like. The present description also applies to brushed and brushless motors and controls.

The present description also applies to power tools that are powered with AC (alternating current) power as well as those power tools that are operated with DC (direct current) power (e.g., with a battery pack).

FIG. 2 illustrates a simplified block diagram 110 of the power tool 10, which includes a power circuit 115, power switching device 120 (e.g., including different combinations and arrangements of Field Effect Transistors (FETs), triac(s), and/or other electronic switches, and the like), a motor 15, at least one speed sensor 125, an electronic processor 135, user input controls 140, and auxiliary components 145 (e.g., work lights (LEDs), current/voltage sensors, indicators, etc.). The power circuit 115 may include, for example, a rectifier, a step-down controller, a filter, and the like. The power circuit 115 conditions the power received from an external power source and provides the electronics of the power tool 10 power at the appropriate level. In some embodiments, the external power source may be a power tool battery pack that is rechargeable and uses, for instance, lithium ion cell technology. In some instances, the power circuit 115 may receive AC power (e.g., 120V/60 Hz) from a tool plug that is coupled to a standard wall outlet. In such instances, the power circuit 115 would then filter, condition, and rectify the received power to output DC power. Although not shown, the electronic processor 135 and other components of the power tool 10 are electrically coupled to the power circuit 115 such that the power circuit 115 provides power thereto.

The speed sensor 125 outputs an indication of the motor speed. The speed sensor 125 is coupled to the motor 15 and to the electronic processor 135. In some embodiments, the speed sensor 125 may include, for example, Hall-effect sensors, a rotary encoder, an inductive sensor, and the like. The speed sensor 125 generates an output signal (e.g., a pulse) of when a magnet of the rotor rotates across the face of the sensor. Based on the motor feedback information from the speed sensor 125, the electronic processor 135 can directly determine the position, speed (i.e., velocity), and acceleration of the rotor.

The user input controls 140 include, for example, the trigger 55 and/or other actuators to change the operation of the power tool 10. The electronic processor 135 receives user control signals from the user input controls 140, such as a depression of the trigger 55 (or similar user actuator). In response to the motor feedback information and user controls, the electronic processor 135 transmits control signals to control the power switching device 120 to drive the motor 15. By selectively enabling and disabling the power switching device 120, power from the power circuit 115 is selectively applied to stator coils of the motor 15 to cause rotation of the rotor of the motor.

In the illustrated embodiment, the electronic processor 135 is implemented by a microprocessor or microcontroller. In other embodiments, the electronic processor 135 may include for example, an application specific integrated circuit, or the like. In some embodiments, the processor implementing the electronic processor 135 also controls other aspects of the power tool 10 such as, for example, a fuel gauge (e.g., a battery charge level indicator), recording usage data, communication with an external device, and the like.

The electronic processor 135 detects when the motor 15 operates in an overload condition and turns off the power tool 10 to protect the power tool 10. An overload condition occurs when, for example, the motor 15 drives a load that is too large for the motor 15. Operating the power tool 10 in an overload condition for an extended period of time may at best, make operation inefficient, and, at worst, damage the power tool 10. Typically, power tools detect an overload condition when a load current of the power tool 10 exceeds a current threshold for longer than a time duration threshold. Selecting adequate thresholds to apply in multiple power tools is challenging because different power tools operate under different conditions. For example, one grinder may be used by a homeowner and will operate under overload conditions due to misuse, while another grinder may be used by a professional contractor who needs to temporarily operate under an overload condition to overcome a particular block. To protect the power tool 10 and extend its life, some power tools discontinue operation of the motor 15 as soon as the overload condition is detected. In some instances, however, the overload condition may be indicated prematurely (e.g., the duration threshold for the overload condition may be too low), and the power tool 10 may shut down unnecessarily. Such an immediate shutdown of the motor prevents the power tool 10 from working through a temporary high-load block. In other instances, the duration threshold for the overload condition may be too high, thereby exposing the power tool 10 to risk of power tool damage.

Some power tools may attempt to alleviate the effect of the duration threshold by monitoring, for example, the current supplied to the motor 15 using a weighted current method, a simple current threshold, or a combination thereof to detect the overload condition and to shut down the power tool 10 in response to detecting the overload condition.

By contrast, in the illustrated embodiment, the electronic processor 135 detects an overload condition based on a measured speed of the motor, and interrupts power to the motor 15 (e.g., shuts down the motor 15) when a cumulative value exceeds an accumulator threshold. As the motor 15 enters the overload condition, the motor speed decreases due to the increasing load on the motor 15. The electronic processor 135 therefore monitors decreases in motor speed to detect when the motor 15 is in an overload condition. The electronic processor 135 also uses a difference between the measured motor speed and a target speed to determine when to shut off the motor 15 to protect the motor 15 from damage while, at the same time, maximizing the available output power of the power tool 10. In some embodiments, the power tool 10 monitors both the motor speed, as mentioned above and described in more detail below, and the load current to detect and respond to an overload condition of the power tool 10.

When the electronic processor 135 determines that the measured speed of the motor 15 is below a target speed, the electronic processor 135 generates weighted speed data (e.g., a weighted quantity) and adds the weighted quantity to an accumulator 200. The target speed is indicative of an overload condition and/or an increased load on the motor 15. The weighted speed data is based on the difference between the measured motor speed and the target motor speed such that when the measured motor speed is only slightly below the target speed a smaller quantity is added to the accumulator 200, but when the measured motor speed is significantly below the target speed a greater quantity is added to the accumulator 200. For example, the weighted speed data is based on a product of a multiplier and the difference between the measured speed and the target speed (i.e., the weighted speed data may correspond to the multiplier multiplied by the difference between the measured speed and the target speed). Directly measuring the motor speed deviation (i.e., the difference between the current motor speed and a target speed), instead of, for example, the electrical current provided to the motor 15, provides a more accurate measurement and detection of the overload condition.

Figure 3:
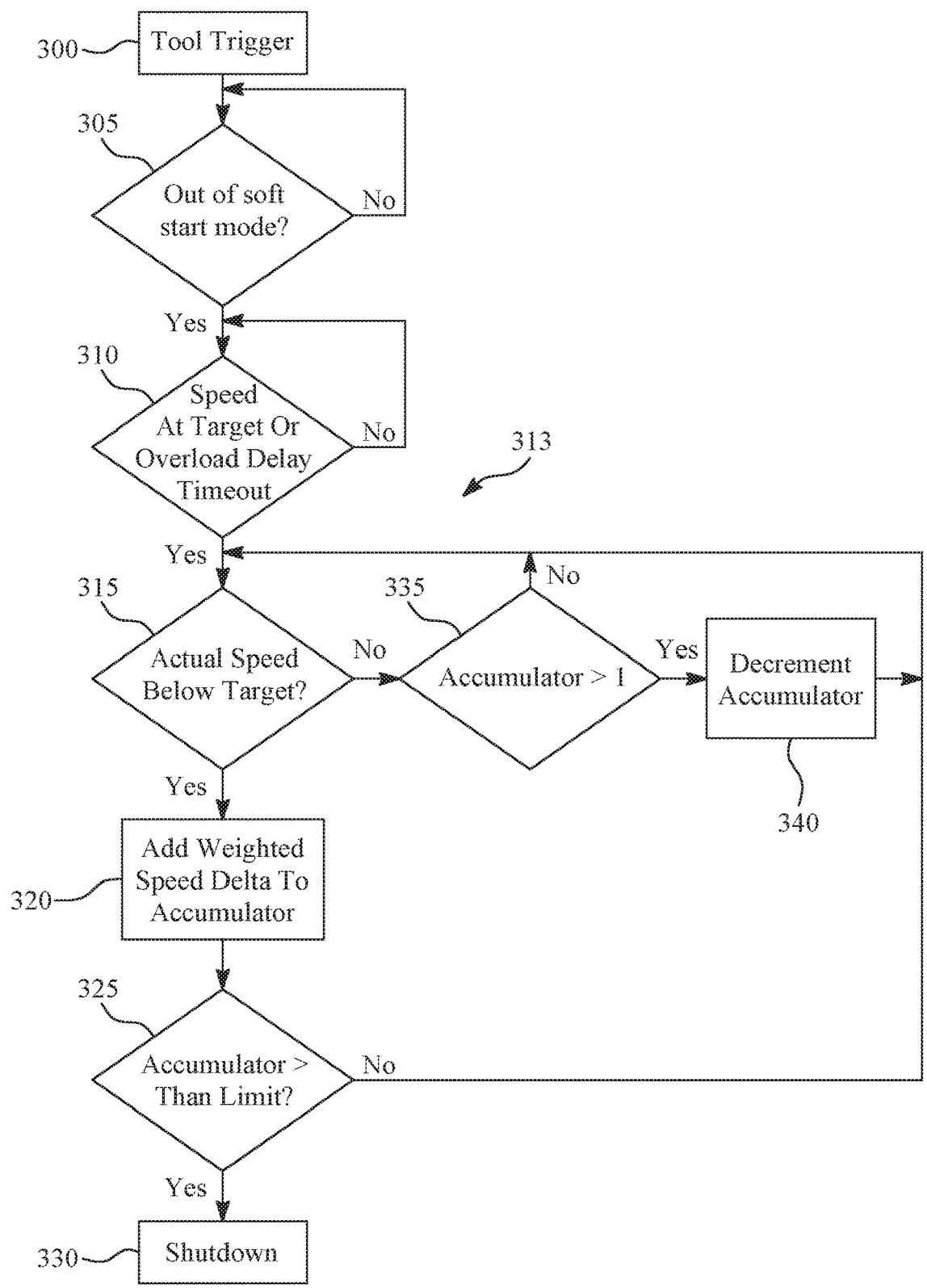
FIG. 3 is a flowchart illustrating a method of detecting an overload condition of the power tool.

FIG. 3 illustrates an overload detection process implemented by the electronic processor 135. The overload detection process illustrated in FIG. 3 effectively changes the duration threshold based on the motor speed by specifically determining a difference between a measured speed of the motor and the target speed. First, the electronic processor 135 waits for a trigger signal from the trigger 55 (step 300). When the electronic processor 135 receives the trigger signal, which indicates a start of the power tool operation, the electronic processor 135 starts a soft start mode. The soft start mode allows the motor 15 of the power tool 10 to speed up from a minimum speed to a desired speed in a controlled manner to extend the life of the motor 15. The desired speed may be determined based on, for example, an amount of trigger depression, a specific operating mode of the power tool 10 (e.g., fast, slow, medium), among other things. The electronic processor 135 then determines whether the power tool 10 has exited the soft start mode (step 305). In some embodiments, the electronic processor 135 may determine that the soft start mode has ended when the motor reaches the desired speed and/or when a soft start timer expires. When the electronic processor 135 determines that the power tool 10 has not yet exited the soft start mode, the electronic processor 135 continues to monitor the power tool 10.

The electronic processor 135 also implements an overload timer. The overload timer provides enough time for the motor 15 to reach the target speed indicative of the overload condition. The electronic processor 135 then determines whether the overload timer has expired and whether the motor 15 has reached a target speed (step 310). The electronic processor 135 continues to monitor the motor speed and the overload timer when the electronic processor 135 determines that the motor speed has not reached the target speed or when the electronic processor 135 determines that the overload timer has not yet expired.

Once the electronic processor 135 determines that the overload timer has expired or that the motor 15 has reached the target speed, the electronic processor 135 initiates actions for the method 318 to detect an overload condition of the power tool 10. The electronic processor 135 determines whether the measured motor speed is below the target speed (step 315). When the electronic processor 135 determines that the measured motor speed, received from the speed sensor 125, is below the target speed, a weighted quantity (e.g., weighted speed data) is added to the accumulator 200 (step 320). As discussed above, the quantity added to the accumulator 200 is weighted based on a multiplier and the difference between the measured motor speed and the target speed (e.g., a speed difference or speed delta). In this manner, when the motor 15 is significantly overloaded, and thus the measured motor speed is significantly below the target speed, a greater quantity is added to the accumulator 200. The electronic processor 135 then compares the accumulator value (e.g., the cumulative value) to a predetermined accumulator threshold (step 325). The predetermined accumulator threshold corresponds to a threshold at which the overload condition of the motor 15 may permanently damage the power tool 10.

When the electronic processor 135 determines that the accumulator value (e.g., the cumulative value) remains below the predetermined accumulator threshold, the electronic processor 135 continues to monitor the motor speed and returns to step 315. In other words, the electronic processor 135 maintains the operation of the motor unchanged while the accumulator value remains below the predetermined accumulator threshold. The electronic processor 135 continues to monitor the motor speed and may therefore receive additional measured speeds of the motor detected at different times (e.g., a second measured speed of the motor at a second time).

When, on the other hand, the electronic processor 135 determines that the accumulator value reaches or exceeds the predetermined accumulator threshold, the electronic processor 135 protects the power tool 10 by interrupting power to the motor 15 to shut off the power tool 10 (step 330). In some embodiments, when the difference between the target speed and the measured motor speed exceeds a maximum delta threshold (or the measured speed is below a minimum speed), the electronic processor 135 adds a maximum quantity to the accumulator 200. In the illustrated embodiment, the maximum quantity added corresponds to a predetermined accumulator threshold such that the value of the accumulator 200 becomes greater than or equal to the accumulator threshold. The electronic processor 135 proceeds to immediately interrupt power to the motor 15 when the difference between the measured motor speed and the target speed exceeds a maximum delta threshold.

Referring back to step 315, when the electronic processor 135 determines that the current motor speed is not below the target speed, the electronic processor 135 proceeds to determine whether the accumulator value is greater than a predetermined lower value (e.g., a minimum value threshold) (step 335). The minimum value threshold establishes a baseline for the accumulator and, in some instances, limits a recovery effect on the power tool 10. For example, if a power tool 10 operates in an overload condition for some period of time and then recovers (i.e., maintains the motor speed at or above the target speed), the electronic processor 135 decreases the value of the accumulator 200 in response to the recovery of the power tool 10. The electronic processor 135 then continues to decrement the accumulator value while the motor speed remains above the target speed until the minimum value threshold is reached. When the minimum value threshold is lower, the recovery period of the power tool 10 can revert or counteract the time the power tool 10 spent in the overload condition. On the other hand, when the minimum value threshold is higher, the recovery period of the power tool 10 may not completely revert or counteract the time the power tool 10 spent in the overload condition. In such embodiments, the accumulator 200 reaches its accumulator threshold faster if the power tool 10 has operated in an overload condition before. In other words, when the minimum value threshold is higher, the accumulator value is affected by the previous time during which the power tool 10 operated in the overload condition, regardless of the time between such occurrences. In the illustrated embodiment, the predetermined lower value is one, but different embodiments will have a different predetermined lower value. When the electronic processor 135 determines that the accumulator value is less than the predetermined lower value, the electronic processor 135 continues to compare the measured motor speed with the target speed at step 315.

When, however, the electronic processor 135 determines that the accumulator value is equal to or greater than the predetermined lower value, the electronic processor 135 proceeds to decrement (i.e., decrease) the accumulator value (step 340). The quantity by which the accumulator value is decreased changes in different embodiments. In some embodiments, the electronic processor 135 decrements a fixed value from the accumulator 200 each time the measured speed exceeds the target speed, and in other embodiments, the electronic processor decrements the value of the accumulator 200 by a weighted value based again on the difference between the target speed and the measured speed of the motor 15. After the accumulator value is decremented, the electronic processor 135 again continues to monitor and compare the current speed of the motor 15 with the target speed (step 315).

Figure 4A:
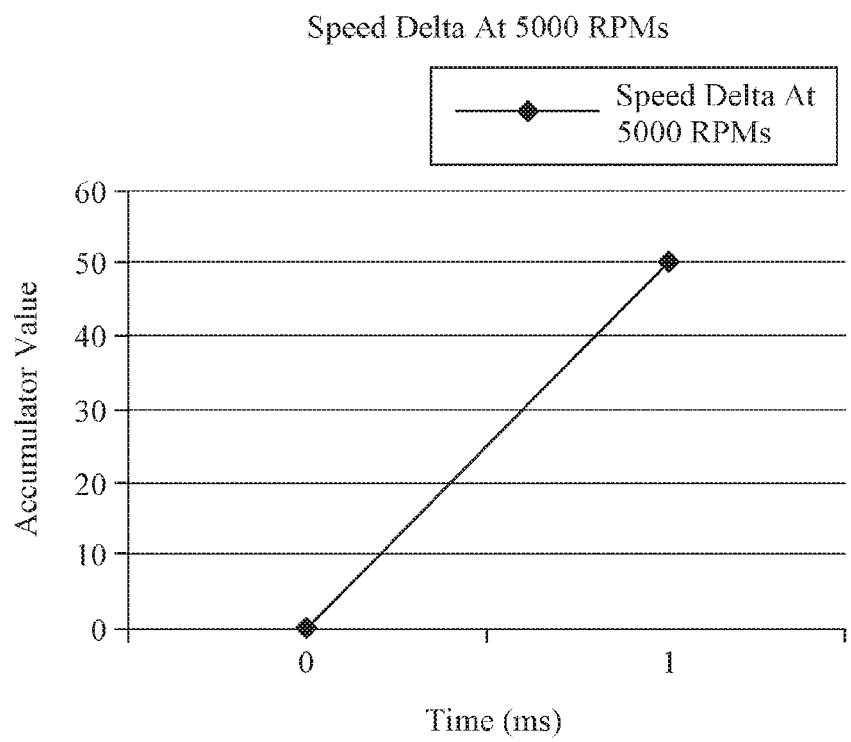
FIG. 4A is an exemplary graph of an accumulator value vs. time when a speed difference is approximately 5000 revolutions per minute (RPM).
Figure 4B:
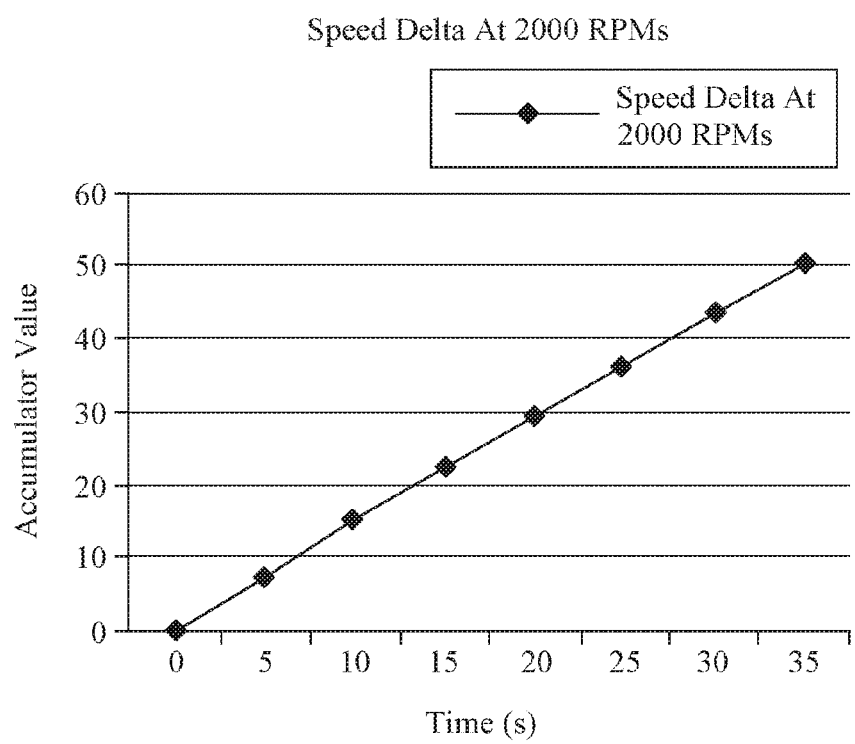
FIG. 4B is another exemplary graph of the accumulator value vs. time when the speed difference is approximately 2000 RPMs.
Figure 4C:
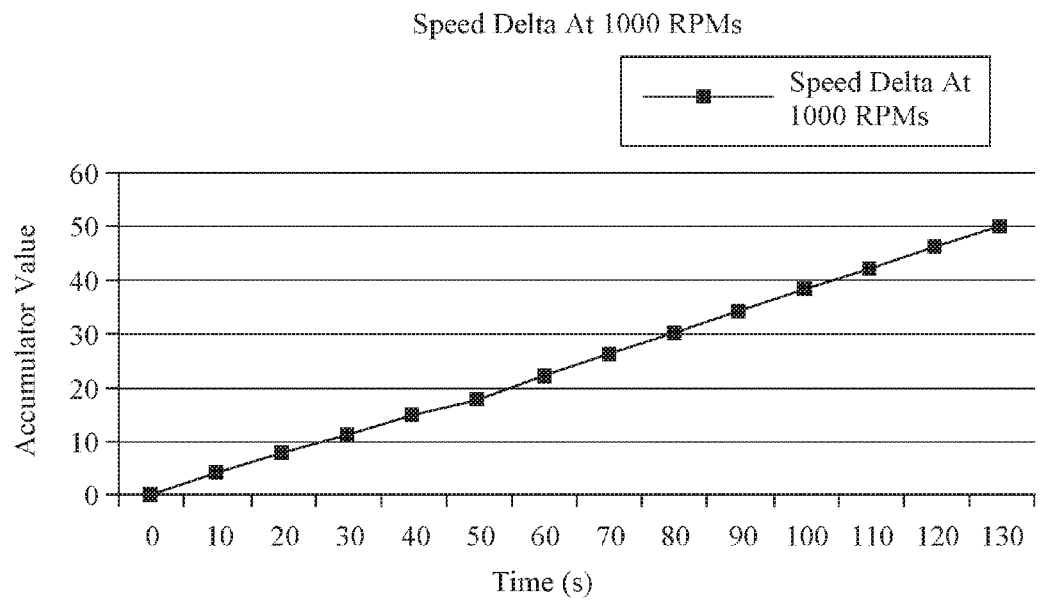
FIG. 4C is another exemplary graph of the accumulator value vs. time when the speed difference is approximately 1000 RPMs.
Figure 5:
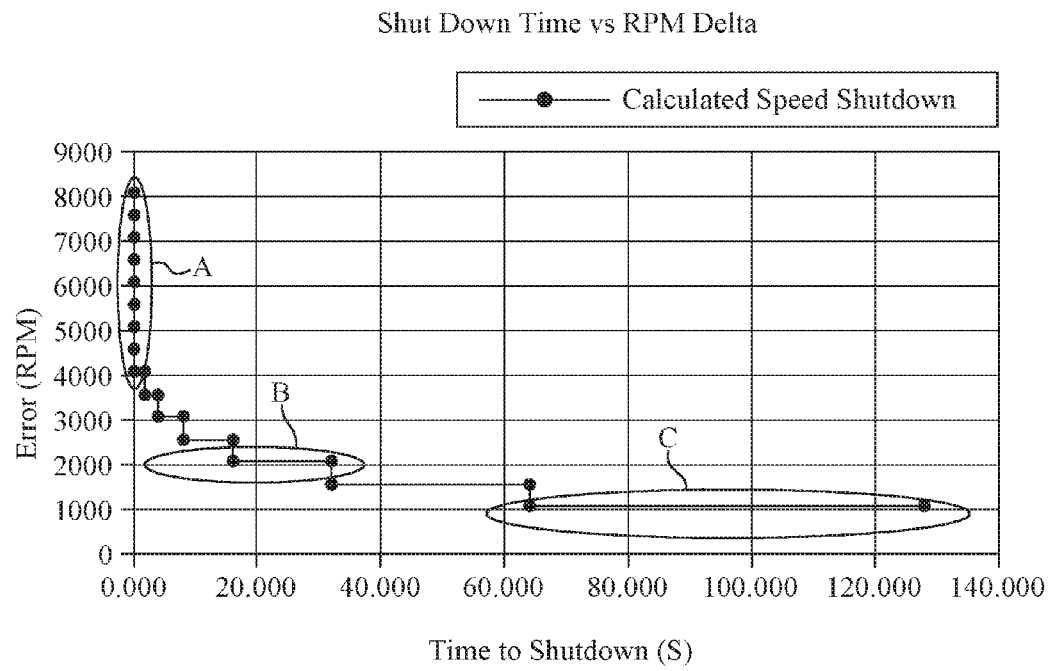
FIG. 5 is an exemplary graph of a speed difference vs. time to shutdown the power tool.

FIGS. 4A-4C are exemplary graphs that illustrate how the accumulator values increase over time, and FIG. 5 is an exemplary graph illustrating how the rate of increase of the accumulator values affects the time to shut down (e.g., the time the power tool 10 continues to operate after the overload condition is detected). In the exemplary graphs of FIGS. 4A-4C and 5, the predetermined accumulator threshold is 50, and the maximum delta threshold is approximately 4100 RPMs (revolutions per minute). As shown in FIG. 4A, when the difference between the measured motor speed and the target speed (e.g., the speed delta) is approximately 5000 revolutions per minute (RPM), the accumulator value automatically increases to the predetermined accumulator threshold. In the embodiment illustrated in FIG. 4A, one millisecond is approximately the time between when the electronic processor 135 determines that the measured speed is less than the target speed and when the electronic processor 135 increases the accumulator value. In other embodiments, the time shown in FIG. 4A varies based on, for example, the hardware executing the algorithm and/or the particular software implementation of the algorithm. Regardless, this time is close to zero seconds. The automatic (e.g., immediate) increase of the accumulator value to the predetermined accumulator threshold results in an almost immediate shutdown time. FIG. 5, portion A illustrates that when the speed delta exceeds the maximum delta threshold (e.g., approximately 4100 RPMs in the illustrated embodiment), the accumulator 200 reaches its maximum value (i.e., accumulator threshold) almost immediately and the shutdown time is nearly immediate (e.g., 0 seconds shown in FIG. 5).

FIG. 4B illustrates the gradual increase of the accumulator value when the speed delta is approximately 2000 RPMs. As shown in FIG. 4B, the accumulator 200 reaches the predetermined accumulator threshold after approximately 35 seconds. FIG. 5, portion B, illustrates that when the speed delta remains at approximately 2000 RPMs, the power tool 10 continues operating for approximately 35 seconds, after which power to the motor 15 is interrupted and the power tool 10 shuts down.

FIG. 4C illustrates a slower increase of the accumulator value when the speed delta is approximately 1000 RPMs. As shown in FIG. 4C, the accumulator 200 reaches the predetermined accumulator threshold after approximately two minutes and 10 seconds (i.e., 130 seconds). FIG. 5, portion C, illustrates that when the speed delta remains at approximately 1000 RPMs, the power tool 10 continues to operate for approximately two minutes, after which power to the motor 15 is interrupted and the power tool 10 shuts down.

As shown by FIGS. 4A-4C and FIG. 5, the time to shut down increases (i.e., the time the power tool 10 continues to operate) as the speed delta decreases. This increase in shut down time allows the power tool 10 to operate at a lower level of overload for an extended period of time before the electronic processor 135 interrupts power to the motor 15 and the power tool 10 shuts down. At the same time, decreasing the shut down time when the speed delta increases protects the power tool 10 from potential damage from extensively operating the power tool 10 in an overload condition.

The overload condition detection and control as described above provides a dynamic control of the power tool 10 in an overload condition, and ensures that the power tool 10 is protected by applying quick shut down times when the overload on the power tool 10 is significant, and that the power tool 10 provides maximum power output and usability for the user.

The invention claimed is:

1. A power tool comprising:
a motor;
a power circuit coupled to the motor for providing power to the motor;
a speed sensor coupled to the motor for detecting a position of the motor; and
an electronic processor coupled to the motor and the speed sensor, the electronic processor configured to:
receive an output signal from the speed sensor indicative of a measured speed of the motor at a first time,
determine a cumulative value based on a difference between the measured speed of the motor and a target speed,
receive a second output signal from the speed sensor indicative of a second measured speed of the motor at a second time,
update the cumulative value based on a difference between the second measured speed of the motor and the target speed, and
interrupt power from the power circuit to the motor when the cumulative value exceeds an accumulator threshold.

2. The power tool of claim 1, wherein the target speed corresponds to a motor speed indicative of an overload condition.

3. The power tool of claim 1, wherein the electronic processor is configured to increase the cumulative value when the measured speed is below the target speed, and decrease the cumulative value when the measured speed exceeds the target speed.

4. The power tool of claim 3, wherein the electronic processor is configured to increase the cumulative value by a weighted quantity, the weighted quantity based on a multiplier and a speed difference corresponding to a difference between the measured speed of the motor and the target speed.

5. The power tool of claim 4, wherein the multiplier which, when multiplied by the speed difference and when the speed difference is greater than a maximum quantity, generates the weighted quantity such that the weighted quantity is greater than or equal to the accumulator threshold.

6. The power tool of claim 1, wherein the electronic processor is configured to
receive a third output signal from the speed sensor indicative of a third measured speed of the motor at a third time,
determine whether the third measured speed of the motor is below a minimum speed;
increase the cumulative value by a maximum quantity when the third measured speed of the motor is below the minimum speed, the maximum quantity corresponding to a value greater than or equal to the accumulator threshold.

7. A method of operating a power tool, the method comprising:

powering a motor of the power tool;
detecting, with a speed sensor, a position of the motor of the power tool;
receiving, at an electronic processor, an output signal from the speed sensor indicative of a measured speed of the motor at a first time;
determining, with the electronic processor, a cumulative value based on a difference between the measured speed of the motor and a target speed and on a difference between the second measured speed of the motor and the target speed
receiving, at the electronic processor, a second output signal from the speed sensor indicative of a second measured speed of the motor at a second time;
updating, with the electronic processor, the cumulative value based on a difference between the second measured speed of the motor and the target speed; and
interrupting power to the motor when the cumulative value exceeds an accumulator threshold.

8. The method of claim 7, further comprising detecting, with the electronic processor, an overload condition when the measured speed is below the target speed.

9. The method of claim 7, further comprising:
increasing, with the electronic processor, the cumulative value when the measured speed is below the target speed; and
decreasing, with the electronic processor, the cumulative value when the measured speed exceeds the target speed.

10. The method of claim 9, wherein increasing the cumulative value includes increasing the cumulative value by a weighted quantity based on a multiplier and a speed difference corresponding to a difference between the measured speed of the motor and the target speed.

11. The method of claim 10, further comprising generating, with the electronic processor, the weighted quantity to be greater than or equal to the accumulator threshold when the speed difference is greater than a maximum quantity.

12. The method of claim 7, further comprising:
receiving, at the electronic processor, a third output signal from the speed sensor indicative of a third measured speed of the motor at a third time;
determining, with the electronic processor, whether the third measured speed of the motor is below a minimum speed; and
increasing the cumulative value by a maximum quantity when the third measured speed of the motor is below the minimum speed, the maximum quantity corresponding to a value greater than or equal to the accumulator threshold.

13. A method of operating a power tool, the method comprising:
powering a motor of the power tool;
detecting, with a sensor, a speed of the motor;
receiving, at an electronic processor, a measured speed of the motor from the sensor;
detecting, with the electronic processor, an overload condition of the motor based on the measured speed of the motor;
generating, via the electronic processor, a cumulative value based on a difference between the measured speed of the motor and a target speed; receiving, at the electronic processor, a second measured speed of the motor from the sensor;
updating, with the electronic processor, the cumulative value based on a difference between the second measured seed of the motor and the target speed; and
maintaining operation of the motor unchanged while the cumulative value remains less than an accumulator threshold.

14. The method of claim 13, further comprising:
generating a weighted quantity based on a multiplier and the difference between the measured speed and the target speed; and
increasing, with the electronic processor, the cumulative value by the weighted quantity when the overload detection is detected.

15. The method of claim 13, further comprising:
determining, with the electronic processor, whether the measured speed is greater than or equal to the target speed; and
decreasing, with the electronic processor, the cumulative value when the measured speed is greater than or equal to the target speed.

16. The method of claim 13, further comprising interrupting power to the motor when the cumulative value exceeds the accumulator threshold.

* * * * *